United States Patent [19]

Matsuura et al.

[11] 4,322,448

[45] Mar. 30, 1982

[54] METHOD OF CONCENTRATING NATURAL FRUIT JUICES BY REVERSE OSMOSIS

[75] Inventors: Takeshi Matsuura; Pierre Blais; Arthur G. Baxter; Srinivasa Sourirajan, all of Ottawa, Canada

[73] Assignee: Canadian Patents & Dev. Ltd., Ottawa, Canada

[21] Appl. No.: 114,700

[22] Filed: Jan. 23, 1980

Related U.S. Application Data

[63] Continuation-in-part of Ser. No. 37,179, May 8, 1979, abandoned.

[30] Foreign Application Priority Data

Jun. 14, 1978 [CA] Canada .................................. 305469

[51] Int. Cl.³ .............................. A23L 2/08; A23L 2/28
[52] U.S. Cl. ..................................... 426/490; 426/387
[58] Field of Search ............... 426/490, 386, 387, 388, 426/422, 478, 424

[56] References Cited

U.S. PATENT DOCUMENTS 3,228,877  1/1966  Mahon .................................. 210/22

OTHER PUBLICATIONS

M. C. Porter and A. S. Michaels, "Membrane Ultrafiltration", Chemical Technology, Jan. 1971, pp. 56-63.
A. S. Michaels, "New Separation Technique for the CPI", Chemical Engineering Process vol. 64, No. 12, 1968; pp. 31-43.
R. L. Merson and A. I. Morgan, Jr. "Juice Concentration by Reverse Osmosis", Food Technology, vol. 22; May 1968, pp. 97-100.

*Primary Examiner*—Raymond N. Jones
*Assistant Examiner*—Elizabeth J. Curtin
*Attorney, Agent, or Firm*—Francis W. Lemon

[57]  ABSTRACT

A reverse osmosis method of concentrating fruit juices wherein a major portion of the fruit juice sugars are removed in a reverse osmosis first stage from the fruit juice at about room temperature and a pressure in the range 500 to 1500 psi, using porous cellulose acetate membrane material, while flavor compounds are removed in a reverse osmosis second stage from the separated water in liquid form therefrom at a temperature in the range 0° C. to about room temperature and a pressure substantially in the range 50 to 1000 psi using asymmetric, porous, polymeric membrane material which is non-polar relative to the membrane material of the first stage as determined by $\delta_d$ of the solubility parameter of the membrane materials. The membrane material of the second stage is preferably at least as polar as the membrane material of the first stage and is preferably of a material selected from the group consisting of cellulose acetate propionate, cellulose acetate butyrate, ethyl cellulose, aromatic polyamide, aromatic polyhydrazide and aromatic polyamide-polyhydrazide copolymer. Preferably the fruit juice fed to the first stage is at a temperature in the range 15° to 30° C. and the separated water fed to the second stage is at a temperature in the range 5° to 10° C.

5 Claims, 1 Drawing Figure

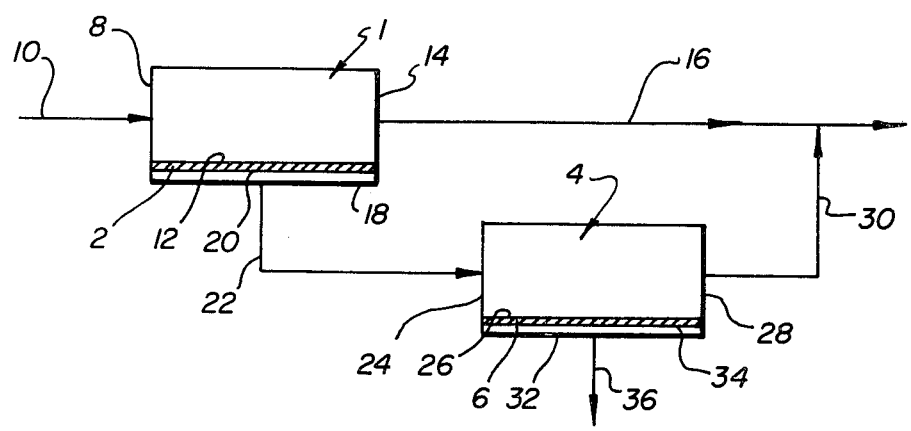

METHOD OF CONCENTRATING NATURAL FRUIT JUICES BY REVERSE OSMOSIS

This application is a continuation-in-part of U.S. Pat. application Ser. No. 37,179 filed May 8, 1979, now abandoned.

This invention relates to a method of concentrating natural fruit juice and the concentrates obtained thereby.

At present, many fruit juices are marketed in their natural concentrations. Frequently, they have to be transported over long distances to the consumer markets. The cost of such transportation, and the cost of containers used for the juices can be reduced considerably if they are concentrated prior to transportation.

It has already been proposed in U.S. Pat. Nos. 1,885,393, dated Nov. 1, 1932, R. H. Van Schaak Jr.; 3,165,415, dated Jan. 12, 1965, R. W. Kilburn et al; 3,423,310, dated Jan. 21, 1969, K. Popper; and 3,858,499, dated Jan. 7, 1975, R. D. Scott, to concentrate fruit juices by dialysis.

It has also been proposed in U.S. Pat. Nos. 3,127,276, dated Mar. 31, 1964, J. A. Brent et al; and 3,743,513, dated July 3, 1973, M. P. Tulin, to concentrate portions of fruit juices by vacuum and by reverse osmosis.

While the above mentioned processes have proved useful, the concentrates so produced have met with limited success commercially because it is not possible to concentrate fruit juice sugars and aromas simultaneously by reverse osmosis or to concentrate aromas by a vacuum process without an undesirably high loss of the aromas. It has not been appreciated that when fruit juice sugars and aromas are concentrated simultaneously by reverse osmosis, the proper temperature, pressure, type of membrane and rate of transfer of water through the membrane for the fruit juice sugar concentration causes an unavoidably high loss of the aromas by carry over with the water extraction. Furthermore, the volatile nature of the aromas causes a loss of components when vacuum concentration is used.

Vacuum distillation for fruit juice concentration is also a highly energy consuming process compared to reverse osmosis. Consequently the application of reverse osmosis for concentration of fruit juices can result in considerable savings in energy, container-material and transportation costs in the commercial marketing of fruit juices.

There is a need for a method of concentrating fruit juices by reverse osmosis when an undesirably high loss of the aromas does not occur.

It is known that the chemical nature of a reverse osmosis membrane material can be characterized by a physicochemical quantity known as the solubility parameter and represented by the symbol $\delta$. This solubility parameter $\delta$ is defined as:

$$\delta = [\Delta E/V]^{\frac{1}{2}}$$

where the quantity $\Delta E/V$ is the energy of vaporization per $cm^3$ of the material; this quantity is a measure of the amount of energy which has to be put into one $cm^3$ of the reverse osmosis membrane material to overcome all the intermolecular forces holding the molecules together. It is also known that the quantity $\delta$ can be decomposed into three components $\delta_h$, $\delta_d$ and $\delta_p$ according to the relation $$\delta^2 = \delta_h^2 + \delta_d^2 + \delta_p^2$$

where $\delta_h$, $\delta_d$ and $\delta_p$ represent components due to hydrogen bonding, dispersion and dipole forces respectively. The values of the solubility parameter $\delta$, and those of its components $\delta_h$, $\delta_d$ and $\delta_p$ for different chemical materials are available directly in the literature, or can be calculated from data given in the literature (for example "The Universality of the Solubility Parameter", C. M. Hansen, Ind. Eng. Chem. Prod. Res. Dev., 8, 2 (1969); D. W. van Krevelen, "Cohesive Properties and Solubility", Chapter 7, "Properties of Polymers", Elsevier, Amsterdam, 1976). The present invention is concerned with the numerical values of $\delta_h$ and $\delta_d$ for the materials of the membranes used in a two stage reverse osmosis process for the concentration of natural fruit juices.

According to the present invention, there is provided a method of concentrating natural fruit juices by reverse osmosis, comprising:

(a) in a first stage, passing a stream of the fruit juice substantially at room temperature and at a pressure in the range 500 to 1500 psi to a relatively higher pressure side of at least one porous, cellulose acetate, reverse osmosis membrane to retain, by reverse osmosis, a major portion of sugars of the fruit juice in the form of a syrup on the relatively higher pressure side, while causing the passage of separated water of the fruit juice containing flavor compounds of the fruit juice, through the said at least one membrane to a relatively lower pressure side thereof, said at least one cellulose acetate, reverse osmosis membrane having values for the solubility parameter due to hydrogen bonding ($\delta_h$) and the solubility parameter due to dispersion ($\delta_d$), of the orders of 6.33 cal$^{1⁄8}$ cm$^{-3/2}$ and 7.60 cal$^{1⁄8}$ cm$^{-3/2}$, respectively, and (b) in a second stage, passing a stream of the said separated water in liquid form, at a temperature in the range 0° C. to the said temperature which is substantially at room temperature, and at a pressure substantially in the range 50 to 1000 psi, to a relatively higher pressure side of at least one asymmetric, porous, polymeric, reverse osmosis membrane in the path of the stream, which is nonpolar relative to the said at least one porous, cellulose acetate, reverse osmosis membrane to retain, by reverse osmosis, flavor compounds of the fruit juice on the relatively higher pressure side while causing the passage of water therefrom through the said at least one second membrane to a relatively lower pressure side thereof, said at least one asymmetric, porous, polymeric, reverse osmosis membrane having a value for the said $\delta_d$ greater than 7.60 cal$^{\frac{1}{2}}$ cm$^{-3/2}$, and (c) collecting the retained sugars and flavor compounds of the fruit juice.

Preferably the said at least one second asymmetric, porous, polymeric, reverse osmosis membrane has a $\delta_h$ value which is at least substantially equal to 4.0 cal$^{\frac{1}{2}}$ cm$^{-3/2}$. The numerical values of $\delta_h$ and $\delta_d$ are approximate quantitative representations of the polar character and nonpolar character respectively of the membrane material. For cellulose acetate material (Eastman grade E-398) whose repeat unit has the chemical formula

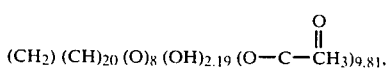

as will be shown later the values of $\delta_h$ and $\delta_d$ are 6.33 and 7.60 in cal$^{178}$ cm.$^{-3/2}$, respectively.

In the first stage (a), the material of the membrane is cellulose acetate which, as previously stated, has $\delta_h$ and $\delta_d$ values in cal$^{178}$ cm$^{-3/2}$ of about 6.3 and 7.6 respectively and the particular membrane used is a reverse osmosis membrane. The fact that the membrane is a reverse osmosis membrane means that it is not an ultrafiltration membrane, but it is a reverse osmosis membrane in the conventional sense of the term indicating that the membrane is capable of giving high (>93%) solute separation for sodium chloride as shown in the following Table 1.

In the second stage (b), the material of the membrane is nonpolar relative to the material of the membrane in the first stage. This means that the value of $\delta_d$ for the material of the membrane used in the second stage is greater than that for the membrane material used in the first stage. The particular membrane used for the second stage is also a reverse osmosis membrane (and not an ultrafiltration membrane) in the conventional sense of the term, as is also shown in the following Table 1.

In the accompanying drawing there is shown, by way of example, a flow diagram of an apparatus used to verify the present invention.

FIG. 1 shows a reverse osmosis first stage 1 having a porous, cellulose acetate, reverse osmosis membrane 2 and a reverse osmosis second stage 4 having an asymmetric, porous, polymeric membrane 6 which is nonpolar relative to the membrane 2.

An inlet end 8 of the reverse osmosis first stage 1 is connected by a supply tube 10 to a source (not shown) of natural fruit juice to supply the fruit juice to a relatively higher pressure side 12 of the membrane 2. A sugar concentrate outlet end 14 of the reverse osmosis first stage 1, from the relatively higher pressure side of the membrane 2, is connected to a sugar-concentrate receiving tube 16 for conveying sugar concentrate to a storage vessel (not shown).

An outlet side 18 of the reverse osmosis first stage 1, for separated water of the fruit juice, containing flavor compounds of the fruit juice, from a relatively low pressure side 20 of the membrane 2, is connected to a separated water of the fruit juice receiving tube 22 for conveying the separated water to an inlet end 24 of the reverse osmosis second stage 4 to a relatively higher pressure side 26 of the membrane 6.

A flavor compounds concentrate outlet end 28 of the reverse osmosis second stage 4, from the relatively higher pressure side 26 of the membrane 6, is connected to a flavor compounds concentrate receiving tube 30 for conveying flavor compounds concentrate to storage, in this embodiment by delivering the flavor compounds concentrate to the sugar concentrate receiving tube 16.

A waste water outlet side 32 of the reverse osmosis second stage 4, from a relatively lower pressure side 34 of the membrane 6, is connected to a waste water receiving tube 36 for disposal of waste water.

The fruit juice on the relatively higher pressure side 12 of the membrane 2 is at substantially room temperature, preferably in the range 15° to 30° C., and is at a pressure in the range 500 to 1500 psi, preferably 1000 psi.

The reverse osmosis first and second stages 1 and 4 each comprise a plurality of reverse osmosis modules, specially made or commercially available in tubular, spiral-wound or hollow fiber configurations.

Thus, in the first stage 1, the primary objective is to recover most (>99%) of the sugars present in the fruit juice; a part of the flavor components present in the juice is also recovered along with the sugars. The first stage 1 reverse osmosis operation is carried out at the ambient temperature, preferably in the range 15° to 30° C., using a cellulose acetate membrane of appropriate surface porosity.

In the second stage 4, the primary objective is to recover a major part of the remaining flavor components by reverse osmosis treatment of the membrane permeated fruit juice water obtained from the first stage 1. Most of the remaining sugars are also recovered in the second stage 4. The second stage 4 is carried out at a lower temperature, preferably in the range 5° to 10° C., than the first stage 1, using an asymmetric porous polymer membrane made of either a cellulosic or non-cellulosic material whose chemical nature is such that it is more nonpolar, preferably both more polar and more nonpolar, than that of the cellulose acetate membrane material used in the first stage. For example, cellulose acetate propionate, cellulose acetate butyrate, ethyl cellulose, aromatic polyamide, aromatic polyhydrazide, and aromatic polyamide-polyhydrazide copolymer are suitable materials for the membrane for the second stage 4.

The concentrate recovered by the first stage 1, combined with the concentrate recovered by the second stage 4, generally constitutes the required fruit juice concentrate for purposes of commercial marketing.

The principle of the oscillatory flow in the reverse osmosis cell described in, for example, "Improving Permeation Flux by Pulsed Reverse Osmosis", T. J. Kennedy, F. L. Merson and B. J. McCoy, Chemical Engineering Science, 1974, Vol. 29, pages 1927–1931, is preferably used in both the first and second stages 1 and 4 to increase the mass transfer coefficient on the high pressure side of each membrane. The first and second stages 1 and 4 are operated at high pressures, preferably substantially in the range 500 to 1000 psi.

Using the apparatus shown in FIG. 1 with cellulose acetate membranes in the first stage 1 and with aromatic polyamide membranes in the second stage 4 for concentration and apple juice water feed solutions concentration respectively, a typical set of performance data obtainable by the process according to the present invention is given below using conditions specified in the following Table 1.

TABLE 1

Membrane Specifications and Operating Conditions

| Membrane material | Stage 1 Cellulose Acetate (CA) | Stage 2 Aromatic Polyamide (PA) |
|---|---|---|
| Membrane Specifications at 25° C. | | |
| Operating pressure, psig | 1000 | 1000 |
| Pure water permeability constant, g mole H$_2$O/cm$^2$ sec atm | 2.0 × 10$^{-6}$ | 0.64 × 10$^{-6}$ |
| Solute transport parameter for NaCl, cm/sec | 4.21 × 10$^{-5}$ | 1.47 × 10$^{-5}$ |
| Mass transfer coefficient for NaCl, cm/sec | 20 × 10$^{-4}$ | 20 × 10$^{-4}$ |
| Solute separation for NaCl with 5000 ppm NaCl-H$_2$O feed solution | 93.5% | 97.2% |
| Operating Conditions for Apple Juice Concentration | | |
| Operating pressure, psig | 1000 | 1000 |
| Operating temperature | 25° C. | 7.5° C. |
| Mass transfer coefficient for NaCl, cm/sec | 20 × 10$^{-4}$ | 20 × 10$^{-4}$ |

TABLE 1-continued

| Membrane Specifications and Operating Conditions | | |
|---|---|---|
| Membrane material | Stage 1 Cellulose Acetate (CA) | Stage 2 Aromatic Polyamide (PA) |
| Volumetric water recovery | 62.3% | 80.2% |
| Membrane area | 1 ft² | 2.5 ft² |
| Operating time: basis | 24 hours | 24 hours |

Under the operating conditions specified in Table 1, the process according to the present invention converts 30 gallons of apple juice with a sugar-content of 10.96 wt % and aroma-content of 500 ppm, into two product streams: one combined stream in tube 16 of 15 gallons of concentrated apple juice containing 21.91 wt % sugars and 902 ppm of flavor components, and another stream in tube 36 of 15 gallons of practically pure water containing 63 ppm sugars and 98 ppm of flavor components and suitable for utilization in other parts of the processing plant.

Of the 30 gallons fed to the first stage 1, 11.3 gallons are received in tube 16 containing 28.05 wt % sugars and 510 ppm flavor components. From the first stage 1, 18.7 gallons of apple juice water containing 0.63 wt % sugars and 494 ppm flavor components are conveyed by the tube 22 to the second stage 4. The tube 30 receives 3.7 gallons of apple juice water containing 3.18 wt % sugars and 2098 ppm flavor components from the second stage 4 and delivers it to the tube 16.

The above concentrated apple juice, when diluted with an equal volume of drinking water, becomes appropriate for personal consumption.

The following calculations of $\delta_h$ and $\delta_d$ are based on equations (7.12) and (7.10) in the previously mentioned van Krevelen publication and the group contributions $E_{hi}$ and $F_{di}$ used in these equations are listed in Table 7.8 of that publication. Furthermore, the molar volume V was calculated by applying additivity rule and using the equation, $$V = \Sigma V_{gi}$$

where $V_{gi}$ denotes the group contribution to molar volume and its numerical values are listed in Table VII (page 590) of that publication as $V_g$.

For your better understanding, the calculation of $\delta_h$ and $\delta_d$ for all the six polymer materials previously mentioned is described below in detail.

Cellulose acetate structure: $(CH_2)_4 (CH)_{20} (OH)_8 (OH)_{2.19} (OCCH_3)_{9.81}$ 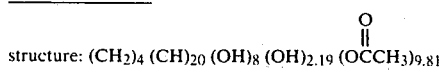

$\Sigma E_{hi} = 4 \times E_{hi}(CH_2) + 20 \times E_{hi}(CH) + 8 \times E_{hi}(O) + 2.19 \times E_{hi}(OH) + 9.81 \times E_{hi}(COO) + 9.81 \times E_{hi}(CH_3) + 4 \times E_{hi}(ring) = 4 \times 0 + 20 \times 0 + 8 \times 3000 + 2.19 \times 20000 + 9.81 \times 7000 + 9.81 \times 0 + 4 \times 0 \times 136470$ $\Sigma F_{di} = 4 \times F_{di}(CH_2) + 20 \times F_{di}(CH) + 8 \times F_{di}(O) + 2.19 \times F_{di}(OH) + 9.81 \times F_{di}(COO) + 9.81 \times F_{di}(CH_3) + 4 \times F_{di}(ring) = 4 \times 270 + 20 \times 80 + 8 \times 100 + 2.19 \times 210 + 9.81 \times 390 + 9.81 \times 420 + 4 \times 190 = 12646$ $V = \Sigma V_{gi} = 4 \times V_{gi}(CH_2) + 20 \times V_{gi}(CH) + 8 \times V_{gi}(O) + 2.19 \times V_{gi}(OH) + 9.81 \times V_{gi}(COO) + 9.81 \times V_{gi}(CH_3) + 4 \times V_{gi}(ring) = 4 \times 15.85 + 20 \times 9.45 + 8 \times 10.0 +$ 2.19 × 9.7 + 9.81 × 23.0 + 9.81 × 23.9 + 4 × 0 = 813.73

$\delta_h = \sqrt{136470/813.73} = 12.95 \ J^{\frac{1}{2}} cm^{-\frac{3}{2}} = 6.33 \ cal^{\frac{1}{2}} cm^{-\frac{3}{2}}$ $\delta_d = 12646/813.73 = 15.54 \ J^{\frac{1}{2}} cm^{-\frac{3}{2}} \ 7.60 \ cal^{\frac{1}{2}} cm^{-\frac{3}{2}}$

Cellulose acetate propionate structure:

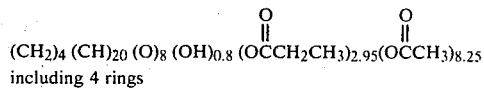

including 4 rings $\Sigma E_{hi} = 6.95 \times E_{hi}(CH_2) + 20 \times E_{hi}(CH) + 8 \times E_{hi}(O) + 0.8 \times E_{hi}(OH) + 11.20 \times E_{hi}(COO) + 11.20 \times E_{hi}(CH_3) + 4 \times E_{hi}(ring) = 6.95 \times 0 + 20 \times 0 + 8 \times 3000 + 0.8 \times 20000 + 11.20 \times 7000 + 11.20 \times 0 + 4 \times 0 = 118400$ $\Sigma F_{di} = 6.95 \times F_{di}(CH_2) + 20 \times F_{di}(CH) + 8 \times F_{di}(O) + 0.8 \times F_{di}(OH) + 11.20 \times F_{di}(COO) + 11.20 \times F_{di}(CH_3) + 4 \times F_{di}(ring) = 6.95 \times 270 + 20 \times 80 + 8 \times 100 + 0.8 \times 210 + 11.20 \times 390 + 11.20 \times 420 + 4 \times 190 = 14276.5$ $V = \Sigma V_{gi} = 6.95 \times V_{gi}(CH_2) + 20 \times V_{gi}(CH) + 8 \times V_{gi}(O) + 0.8 \times V_{gi}(OH) + 11.20 \times V_{gi}(COO) + 11.20 \times V_{gi}(CH_3) + 4 \times V_{gi}(ring) = 6.95 \times 15.85 + 20 \times 9.45 + 8 \times 10.0 + 0.8 \times 9.7 + 11.20 \times 23.0 + 11.20 \times 23.9 + 4 \times 0 = 912.20$ $\delta_d = \sqrt{118400/912.20} \ 11.39 \ J^{\frac{1}{2}} cm^{-\frac{3}{2}} = 5.57 \ cal^{\frac{1}{2}} cm^{-\frac{3}{2}}$ $\delta_d = 14276.5/912.20 = 15.65 \ J^{\frac{1}{2}} cm^{-\frac{3}{2}} = 7.65 \ cal^{\frac{1}{2}} cm^{-\frac{3}{2}}$

Cellulose acetate butyrate

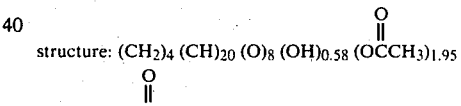

structure: $(CH_2)_4 (CH)_{20} (O)_8 (OH)_{0.58} (OCCH_3)_{1.95}$ $(OCCH_2CH_2CH_3)_{9.47}$ including 4 rings $\Sigma E_{hi} = 22.94 \times E_{hi}(CH_2) + 20 \times E_{hi}(CH) + 8 \times E_{hi}(O) + 0.58 \times E_{hi}(OH) + 11.42 \times E_{hi}(COO) + 11.42 \times E_{hi}(CH_3) + 4 \times E_{hi}(ring) = 22.94 \times 0 + 20 \times 0 + 8 \times 3000 + 0.58 \times 20000 + 11.42 \times 7000 + 11.42 \times 0 + 4 \times 0 = 115540$ $\Sigma F_{di} = 22.94 \times F_{di}(CH_2) + 20 \times F_{di}(CH) + 8 \times F_{di}(O) + 0.58 \times F_{di}(OH) + 11.42 \times F_{di}(COO) + 11.42 \times F_{di}(CH_3) + 4 \times F_{di}(ring) = 22.94 \times 270 + 20 \times 80 + 8 \times 100 + 0.58 \times 210 + 11.42 \times 390 + 11.42 \times 420 + 4 \times 190 = 18725.8$ $V = \Sigma V_{gi} = 22.94 \times V_{gi}(CH_2) + 20 \times V_{gi}(CH) + 8 \times V_{gi}(O) + 0.58 \times V_{gi}(OH) + 11.42 \times V_{gi}(COO) + 11.42 \times V_{gi}(CH_3) + 4 \times V_{gi}(ring) = 22.94 \times 15.85 + 20 \times 9.45 + 8 \times 10.0 + 0.58 \times 9.7 + 11.42 \times 23.0 + 11.42 \times 23.9 + 4 \times 0 = 1173.83$ $\delta_h = \sqrt{115540/1173.83} = 9.92 \ J^{\frac{1}{2}} cm^{-\frac{3}{2}} =$ $4.85 \ cal^{\frac{1}{2}} cm^{-\frac{3}{2}}$ $\delta_d = 18725.8/1173.83 = 15.95 \ J^{\frac{1}{2}} cm^{-\frac{3}{2}} =$ $7.80 \ cal^{\frac{1}{2}} cm^{-\frac{3}{2}}$

Aromatic polyamide structure: $NH\phi_m \ NHCO\phi_r \ CO$

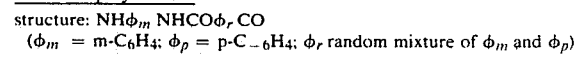

-continued $$\Sigma E_{hi} = 2 \times E_{hi}(\text{phenylene}) + 2 \times E_{hi}(-\overset{\overset{O}{\|}}{C}-\overset{\overset{H}{|}}{N}-, \text{aromatic})$$
$$= 2 \times 0 + 2 \times 32500 = 65000$$
$$\Sigma F_{di} = 2 \times F_{di}(\text{phenylene}) + 2 \times F_{di}(CO) + 2 \times F_{di}(NH)$$
$$= 2 \times 1270 + 2 \times 290 + 2 \times 160 = 3440$$

$$V = \Sigma V_{gi} = 2 \times V_{gi}(\text{phenylene}) + 2 \times V_{gi}(-\overset{\overset{O}{\|}}{C}-\overset{\overset{H}{|}}{N}-)$$
$$= 2 \times 65.5 + 2 \times 24.9 = 180.8$$

$$\delta_h = \sqrt{65000/180.8} = 18.96 \text{ J}^{\frac{1}{2}} \text{cm}^{-\frac{3}{2}} = 9.27 \text{ cal}^{\frac{1}{2}} \text{cm}^{-\frac{3}{2}}$$

$$\delta_d = 3440/180.8 = 19.03 \text{ J}^{\frac{1}{2}} \text{cm}^{-\frac{3}{2}} = 9.30 \text{ cal}^{\frac{1}{2}} \text{cm}^{-\frac{3}{2}}$$

Aromatic polyhydrazide structure: NHNHCO $\phi_m$ CONHNHCO$\phi_r$CO
($\phi_m$, $\phi_p$ and $\phi_r$ same as in aromatic polyamide)

$$\Sigma E_{hi} = 2 \times E_{hi}(\text{phenylene}) + 2 \times E_{hi}(-\overset{\overset{O}{\|}}{C}-NHNH-\overset{\overset{O}{\|}}{C}-, \text{aromatic})$$
$$= 2 \times 0 + 2 \times 44500 = 89000$$
$$\Sigma F_{di} = 2 \times F_{di}(\text{phenylene}) + 4 \times F_{di}(CO) + 4 \times F_{di}(NH)$$
$$= 2 \times 1270 + 4 \times 290 + 4 \times 160 = 4340$$

$$V = \Sigma V_{gi} = 2 \times V_{gi}(\text{phenylene}) + 4 \times V_{gi}(-\overset{\overset{O}{\|}}{C}-\overset{\overset{H}{|}}{N}-)$$
$$= 2 \times 65.5 + 4 \times 24.9 = 230.6$$

$$\delta_h = \sqrt{89000/230.6} = 19.65 \text{ J}^{\frac{1}{2}} \text{cm}^{-\frac{3}{2}} = 9.60 \text{ cal}^{\frac{1}{2}} \text{cm}^{-\frac{3}{2}}$$

$$\delta_d = 4340/230.6 = 18.82 \text{ J}^{\frac{1}{2}} \text{cm}^{-\frac{3}{2}} = 9.20 \text{ cal}^{\frac{1}{2}} \text{cm}^{-\frac{3}{2}}$$

Aromatic polyamide-polyhydrazide structure: NH$\phi_r$ CONHNHCO$\phi_r$CO
($\phi_r$ same as in aromatic polyamide)
$\delta_h$ and $\delta_d$ are average values of aromatic polyamide and aromatic polyhydrazide.

$$\delta_h = \frac{9.27 + 9.60}{2} = 9.44 \text{ cal}^{\frac{1}{2}} \text{cm}^{-\frac{3}{2}}$$

$$\delta_d = \frac{9.30 + 9.20}{2} = 9.25 \text{ cal}^{\frac{1}{2}} \text{cm}^{-\frac{3}{2}}$$

We claim:

1. A method of concentrating natural fruit juices by reverse osmosis, comprising:

(a) in a first stage, passing a stream of the fruit juice substantially at room temperature and at a pressure in the range 500 to 1500 psi to a relatively higher pressure side of at least one porous, cellulose acetate, reverse osmosis membrane to retain, by reverse osmosis, a major portion of sugars of the fruit juice in the form of a syrup on the relatively higher pressure side, while causing the passage of separated water of the fruit juice containing flavor compounds of the fruit juice, through the said at least one membrane to a relatively lower pressure side thereof, said at least one cellulose acetate, reverse osmosis membrane having values for the solubility parameter due to hydrogen bonding ($\delta_h$) and the solubility parameter due to dispersion ($\delta_d$) of the orders of 6.33 cal$^{\frac{1}{2}}$ cm$^{-3/2}$ and 7.60 cal$^{\frac{1}{2}}$ cm$^{-3/2}$ respectively, and (b) in a second stage, passing a stream of the said separated water in liquid form, at a temperature in the range 0° C. to the said temperature which is substantially at room temperature, and at a pressure substantially in the range 50 to 1000 psi, to a relatively higher pressure side of at least one asymmetric, porous, polymeric, reverse osmosis membrane in the path of the stream, which is non-polar relative to the said at least one porous, cellulose acetate, reverse osmosis membrane to retain, by reverse osmosis, flavor compounds of the fruit juice on the relatively higher pressure side while causing the passage of water therefrom through the said at least one second membrane to a relatively lower pressure side thereof, said at least one asymmeric, porous, polymeric, reverse osmosis membrane having a value for the said $\delta_d$ greater than 7.60 cal$^{\frac{1}{2}}$ cm$^{-3/2}$, and (c) collecting the retained sugars and flavor compounds of the fruit juice.

2. A method according to claim 1, wherein the said at least one second, asymmetric, porous, polymeric, reverse osmosis membrane has a $\delta_h$ value which is at least substantially equal to 4.0 cal$^{\frac{1}{2}}$ cm$^{-3/2}$.

3. A method according to claim 1, wherein the said at least one second, asymmetric, porous, polymeric, reverse osmosis membrane is of a material selected from the group consisting of cellulose acetate propionate, cellulose acetate butyrate, ethyl cellulose, aromatic polyamide, aromatic polyhydrazide and aromatic polyamide-polyhydrazide copolymer.

4. A method according to claim 1, wherein the stream of fruit juice in the first stage is at a temperature in the range 15° to 30° C.

5. A method according to claim 1, wherein the said stream of separated water in the second stage is at a temperature in the range 5° to 10° C.

* * * * *